United States Patent
Fey

(10) Patent No.: US 11,572,821 B2
(45) Date of Patent: Feb. 7, 2023

(54) METHOD AND PROCESSING UNIT FOR ASCERTAINING A FILL LEVEL OF AN EXHAUST-GAS COMPONENT IN A CATALYTIC CONVERTER

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/321,959

(22) Filed: May 17, 2021

(65) Prior Publication Data

US 2021/0363909 A1 Nov. 25, 2021

(30) Foreign Application Priority Data

May 20, 2020 (DE) ...................... 10 2020 206 357.5

(51) Int. Cl.
*F01N 11/00* (2006.01)

(52) U.S. Cl.
CPC .......... *F01N 11/002* (2013.01); *F01N 11/007* (2013.01); *F01N 2550/02* (2013.01);
(Continued)

(58) Field of Classification Search
CPC .. F01N 11/002; F01N 11/007; F01N 2550/02; F01N 2900/1602; F01N 2900/1624
See application file for complete search history.

(56) References Cited

U.S. PATENT DOCUMENTS

| 2003/0101718 A1* | 6/2003 | Pfeifer | B01D 53/9431 60/299 |
| 2005/0028517 A1* | 2/2005 | Nakagawa | F01N 3/30 60/285 |

(Continued)

FOREIGN PATENT DOCUMENTS

| DE | 10252303 A1 | 6/2003 |
| DE | 102016222418 A1 | 5/2018 |
| DE | 102019120781 A1 | 2/2020 |

OTHER PUBLICATIONS

Jankovic, "Review: Introduction to Modeling and Control of Internal Combustion Engine Systems, Guzzella et al.", IEEE Control Systems Magazine, 2005, pp. 96-99.

*Primary Examiner* — Matthew T Largi
(74) *Attorney, Agent, or Firm* — Michael Best & Friedrich LLP

(57) ABSTRACT

A method for ascertaining a fill level of at least one exhaust-gas component, which can be stored in a catalytic converter and which is generated in a combustion process, in the catalytic converter, wherein a variation of the fill level of the at least one exhaust-gas component in the catalytic converter during the combustion process is determined, wherein, during time periods in which the combustion process is not operated, a diffusion-induced change of the fill level of the at least one exhaust-gas component in the catalytic converter is determined, and wherein, on the basis of the determined variation during the combustion process and the diffusion-induced change, a fill level of the at least one exhaust-gas component in the catalytic converter is ascertained. The invention furthermore relates to a processing unit and to a computer program for carrying out such a method.

9 Claims, 2 Drawing Sheets

(52) U.S. Cl.
CPC ............ *F01N 2900/1602* (2013.01); *F01N 2900/1624* (2013.01)

(56) References Cited

U.S. PATENT DOCUMENTS

| | | | | |
|---|---|---|---|---|
| 2008/0257325 A1* | 10/2008 | Takubo | ............... | F02D 41/123 |
| | | | | 123/672 |
| 2014/0250993 A1* | 9/2014 | Aoki | ................ | F01N 11/007 |
| | | | | 73/114.75 |
| 2014/0283503 A1* | 9/2014 | Roesch | ............... | G01N 22/00 |
| | | | | 60/274 |
| 2015/0247434 A1* | 9/2015 | Hayashita | ............ | F01N 3/0835 |
| | | | | 60/285 |
| 2015/0322878 A1* | 11/2015 | Okazaki | ............ | F02D 41/0295 |
| | | | | 60/285 |
| 2016/0097337 A1* | 4/2016 | Ito | ................... | F02D 41/065 |
| | | | | 701/104 |
| 2017/0037804 A1* | 2/2017 | Nakagawa | ............... | F01N 9/00 |
| 2019/0309698 A1* | 10/2019 | Eckart | ............... | F02D 41/1458 |
| 2020/0049090 A1* | 2/2020 | Kuroda | ............. | F02D 41/0295 |

\* cited by examiner

METHOD AND PROCESSING UNIT FOR ASCERTAINING A FILL LEVEL OF AN EXHAUST-GAS COMPONENT IN A CATALYTIC CONVERTER

BACKGROUND OF THE INVENTION

The present invention relates to a method for ascertaining a fill level of an exhaust-gas component in a catalytic converter, and to a processing unit and a computer program for carrying out said method.

Modern motor vehicles are commonly equipped with catalytic converters for the aftertreatment of an exhaust gas of an internal combustion engine. In many cases, these catalytic converters are monitored and/or controlled in closed-loop fashion.

In the case of an incomplete combustion of the fuel/air mixture in an Otto engine, numerous combustion products are emitted aside from nitrogen ($N_2$), carbon dioxide ($CO_2$) and water ($H_2O$), of which combustion products hydrocarbons (HC), carbon monoxide (CO) and nitrogen oxides ($NO_x$) are limited by legislation. The applicable exhaust-gas limit values for motor vehicles can, in the current state of the art, be adhered to only by way of catalytic exhaust-gas aftertreatment. Said pollutant components can be converted through the use of, for example, a three-way catalytic converter.

In three-way catalytic converters, a simultaneously high conversion rate for HC, CO and $NO_x$ is attained only in a narrow lambda range around the stoichiometric operating point (lambda=1), the so-called "catalytic converter window" or "conversion window".

For the operation of the three-way catalytic converter in the conversion window, it is typically the case in modern engine control systems that closed-loop lambda control is used, which is based on the signals of lambda probes arranged upstream and downstream of the three-way catalytic converter. For the closed-loop control of the air ratio lambda, which is a measure for the composition of the fuel/air ratio of the internal combustion engine, the oxygen content of the exhaust gas upstream of the three-way catalytic converter is measured by means of an inlet-side lambda probe arranged there. In a manner dependent on this measured value, the closed-loop control corrects for example the fuel quantity or injection duration, which is predefined in the form of a base value by a pilot control function.

In the context of the pilot control, base values of fuel quantities to be injected are predefined in a manner dependent on, for example, rotational speed and load of the internal combustion engine. For even more exact closed-loop control, the oxygen concentration of the exhaust gas downstream of the three-way catalytic converter may additionally be detected by means of a further lambda probe. The signal of this outlet-side lambda probe can be used for master control, which is superposed on the closed-loop lambda control upstream of the three-way catalytic converter based on the signal of the inlet-side lambda probe. As a lambda probe arranged downstream of the three-way catalytic converter, use is generally made of a two-step lambda probe, which has a very steep characteristic curve at lambda=1 and can therefore indicate lambda=1 very exactly.

Aside from the master control, which generally corrects only small deviations from lambda=1 and which is configured to be relatively slow, another functionality for large deviations from lambda=1, in the form of lambda pilot control, may be provided in order that the conversion window is reached again quickly, which is important for example after overrun cut-off phases, in which the three-way catalytic converter is charged with oxygen. The charging with oxygen impairs the $NO_x$ conversion.

Owing to the oxygen storage capacity of the three-way catalytic converter, lambda=1 may prevail downstream of the three-way catalytic converter for a further several seconds after rich or lean lambda has been set upstream of the three-way catalytic converter. This characteristic of the three-way catalytic converter of temporarily storing oxygen is utilized in order to compensate brief deviations from lambda=1 upstream of the three-way catalytic converter. If lambda not equal to 1 prevails upstream of the three-way catalytic converter for a relatively long period, the same lambda will also take effect downstream of the three-way catalytic converter as soon as, in the case of lambda >1 (excess of oxygen), the oxygen fill level exceeds the oxygen storage capacity, or as soon as, in the case of lambda <1, there is no longer any oxygen stored in the three-way catalytic converter.

At this point in time, a two-step lambda probe downstream of the three-way catalytic converter then also indicates a departure from the conversion window. Up to this point in time, the signal of the lambda probe downstream of the three-way catalytic converter however does not indicate the impending breakthrough, and master control based on this signal therefore often first reacts so late that the fuel metering can no longer react in good time before a breakthrough. As a consequence, increased emissions occur. Such closed-loop control concepts therefore have the disadvantage that they identify a departure from the conversion window, on the basis of the voltage of the two-step lambda probe downstream of the three-way catalytic converter, only at a late point in time.

DE 10 2016 222 418 A1 has disclosed a model-based closed-loop control concept in which in each case one lambda sensor is arranged upstream and downstream of the catalytic converter in a flow direction of the exhaust gas and a catalytic converter model is used to model a fill level of the catalytic converter with regard to one or more exhaust-gas components, in particular with regard to oxygen.

SUMMARY OF THE INVENTION

According to the invention, a method for ascertaining a fill level of at least one exhaust-gas component, which can be stored in a catalytic converter and which is generated in a combustion process, in the catalytic converter, and a processing unit and a computer program for carrying out said method, having the features of the independent patent claims, are proposed. The subclaims and the following description relate to advantageous configurations of the subject matter.

The invention makes use of the measure, in the determination of the fill level of an exhaust-gas component in a catalytic converter, in particular oxygen in a three-way catalytic converter, of taking into consideration not only combustion-induced variations of the component in the catalytic converter but also diffusion processes that take place outside combustion processes. In particular, the invention makes use of modeling of the diffusion of gaseous oxygen into a catalytic converter and of the storage of oxygen in the catalytic converter when the internal combustion engine is at a standstill.

The respectively present fill level can thus be determined even more accurately. By taking into consideration diffusion processes that lead to a variation of the oxygen fill level in a catalytic converter, further improved model-based closed-loop control of a catalytic converter is made possible, by means of which, in particular, a departure from the catalytic converter window can be identified at an early point in time and prevented as far as possible, or by means of which the catalytic converter, after a departure from the catalytic converter window, is brought back into the catalytic converter window again with the least possible emissions. Also, for example upon the resumption of the combustion, modeling of the catalytic converter fill level is more precise from the outset. In this way, pollutant emissions can be more reliably prevented and reduced overall, and at the same time the combustion process can be controlled more efficiently.

In one advantageous configuration, at least one state variable, in particular a temperature and/or a temperature distribution, of the catalytic converter is determined, and the diffusion-induced change of the catalytic converter fill level is determined in a manner dependent on the at least one state variable. This is advantageous because the temperature and other influential parameters have a decisive influence on diffusion processes.

Advantageously, concentrations of the at least one exhaust-gas component upstream and/or downstream of the catalytic converter are determined and, on the basis of a concentration gradient ascertained therefrom, a diffusion direction and/or a diffusion rate of the at least one exhaust-gas component is calculated and is taken into consideration in the calculation of the diffusion-induced change of the catalytic converter fill level. In this way, the diffusion direction and rate can be determined more precisely, which has a positive effect on the fill level model.

Advantageously, the fill level of the at least one exhaust-gas component is, after resumption of the combustion, controlled in closed-loop fashion on the basis of the ascertained fill level, that is to say the ascertained value as actual value is aligned with a setpoint value through control of the combustion. In particular, this encompasses the combustion process being controlled such that the fill level increases if it lies below a setpoint value and decreases if it lies above the setpoint value. In this way, the diffusion of the exhaust-gas components in times in which the combustion process is not being operated can be taken into consideration in the control of subsequent operation of the combustion process, in order to reduce emissions overall.

The at least one exhaust-gas component preferably comprises oxygen and/or a hydrocarbon and/or carbon monoxide and/or a nitrogen oxide. These are particularly relevant for control of an exhaust-gas catalytic converter. In particular, the diffusion of oxygen into the catalytic converter plays a crucial role in the lowering of the overall emissions.

The combustion process is advantageously performed in the interior of an internal combustion engine, in particular in a vehicle. These applications make a considerable contribution to corresponding pollutant emissions into the environment, and are particularly affected by limitations by legislation, such that there is a particular demand for adaptation here.

A processing unit according to the invention, for example a control unit of a motor vehicle, is configured, in particular in terms of programming technology, to carry out a method according to the invention.

The implementation of a method according to the invention in the form of a computer program or computer program product with program code for carrying out all of the method steps is also advantageous, because this entails particularly low costs, in particular if an executing control unit is also used for other tasks and is therefore present in any case. Suitable data carriers for providing the computer program are in particular magnetic, optical and electrical memories, such as for example hard drives, flash memories, EEPROMs, DVDs and others. A download of a program via computer networks (Internet, intranet, etc.) is also possible.

BRIEF DESCRIPTION OF THE DRAWINGS

Further advantages and configurations of the invention will emerge from the description and the appended drawing.

The invention is illustrated schematically in the drawing on the basis of an exemplary embodiment, and will be described below with reference to the drawing.

DETAILED DESCRIPTION

Figure 1:
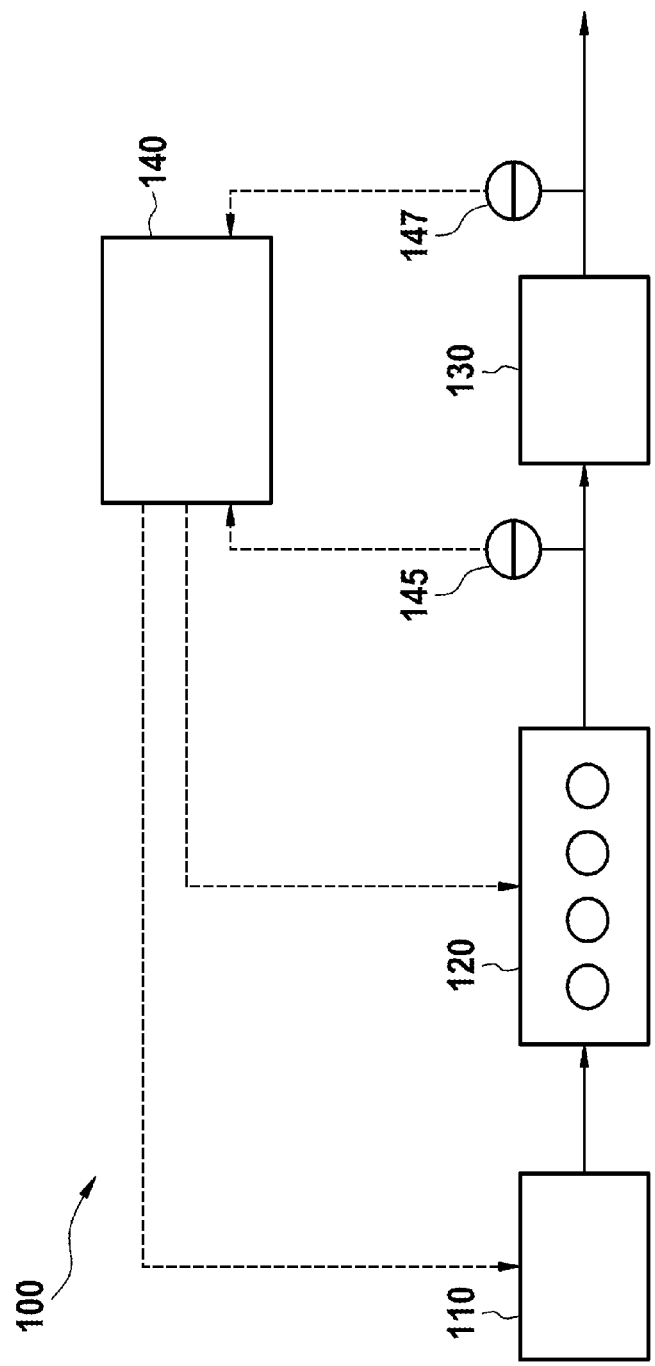
FIG. 1 shows an arrangement with an internal combustion engine which is configured for carrying out an advantageous configuration of a method according to the invention, in a schematic illustration.

In FIG. 1, an arrangement which is configured for carrying out an advantageous configuration of a method according to the invention and which can be arranged for example in a vehicle is shown in a schematic illustration and is denoted as a whole by 100.

The arrangement 100 comprises an internal combustion engine 120, for example a diesel or Otto engine, a fuel treatment device 110, an exhaust-gas catalytic converter 130, which may for example be in the form of a three-way catalytic converter, a processing unit 140, for example an engine control unit (ECU), and sensors 145, 147, which are provided for example in the form of lambda sensors, thermocouples, pressure sensors and/or measuring units for concentrations, temperatures, pressures or other physical or chemical variables that can describe or influence a state of an exhaust-gas system.

In particular, the invention makes use of modeling of the diffusion of gaseous oxygen into the catalytic converter 130 and of the storage of oxygen in the catalytic converter 130 when the internal combustion engine 120 is at a standstill. For this purpose, it may be provided that, upon the transition from a phase with the internal combustion engine running to a diffusion phase with the internal combustion engine at a standstill, the present state variables of the catalytic converter are detected. These are for example fill levels such as the oxygen fill level or the fill level of rich gas components or a fill level distribution in the catalytic converter, the storage capacity of the catalytic converter and the mean temperature of the catalytic converter or a temperature distribution in the catalytic converter. With these state variables, a diffusion model of the catalytic converter is initialized, which model replicates the development over time of the oxygen fill level of the real catalytic converter during the diffusion phase.

Upon the transition from a diffusion phase to a phase with the internal combustion engine running, it is conversely the case that the state variables of the diffusion model are acquired and, with the aid thereof, a model of the catalytic converter is initialized, which model replicates the development over time of the oxygen fill level of the real catalytic converter when the internal combustion engine 120 is running.

By means of this approach, improved correlation of the modeled and the real state variables of the catalytic converter immediately after a diffusion phase can be achieved.

In this way, in turn, the fill level of the catalytic converter after the starting of the internal combustion engine can be better adjusted. The emissions can thus be further reduced. More stringent legal requirements can be adhered to with lower costs for the catalytic converter.

Figure 2:
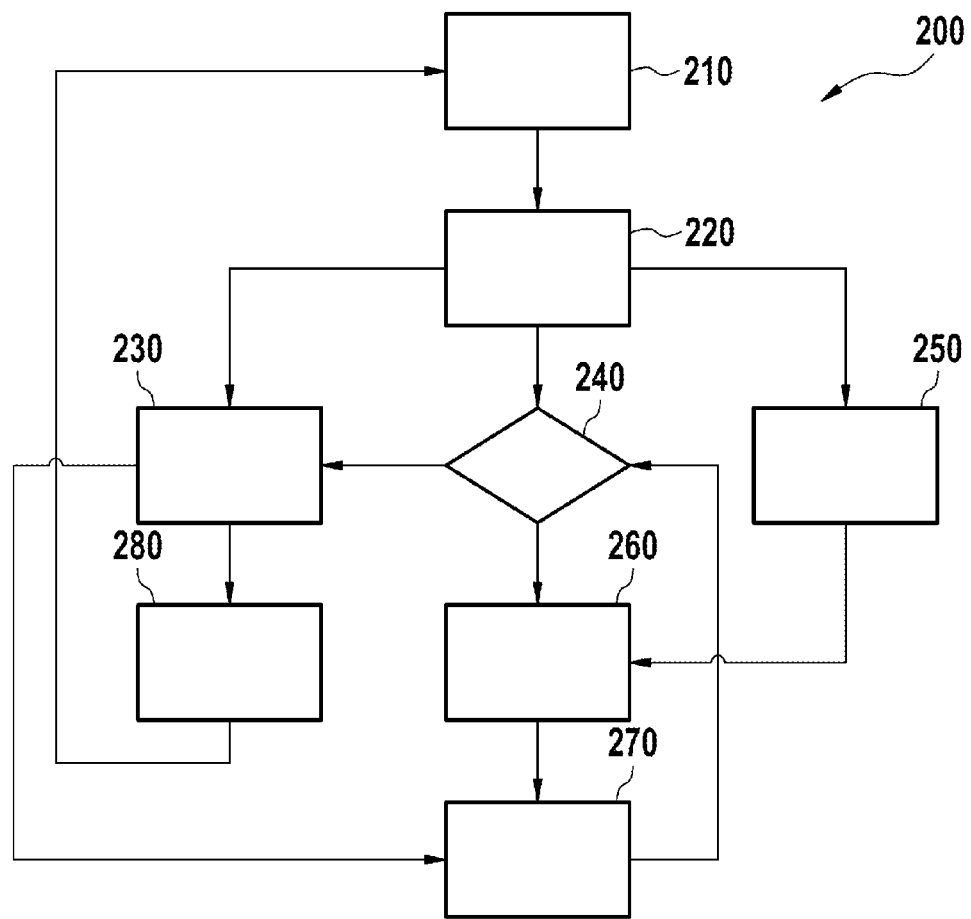
FIG. 2 shows an advantageous configuration of a method according to the invention in the form of a highly simplified flow diagram.

In FIG. 2, a configuration of a method according to the invention is illustrated in the form of a highly simplified flow diagram and is denoted as a whole by 200.

The method begins with an initialization step 210 in which, for example, commands are output by the control unit 140 to assemblies of the arrangement 100.

In a step 220, a state of an exhaust gas generated by the internal combustion engine 120 is determined. For this purpose, it is possible for signals from one or more of the sensors 145, 147, for example from a lambda probe 145 which is arranged upstream of the exhaust-gas catalytic converter 130, to be evaluated. For example, in the step 220, a mass flow and an oxygen concentration of the exhaust gas are ascertained. From this ascertained state of the exhaust gas, a fill level of the exhaust-gas catalytic converter 130 is determined in a step 230. For example, the fill level relates to oxygen stored in the catalytic converter 130 in relation to a maximum storable or presently storable maximum quantity of oxygen. For this purpose, use may for example be made of model calculations based on a system model of the catalytic converter parameterized for example with the sensor data acquired in the step 220. Present and/or previous control parameters that the control unit 140 is outputting or has output to the internal combustion engine 120 or the fuel treatment device 110 may also be incorporated into such a model calculation. Modeling for oxygen fill levels in catalytic converters is described for example in Lino Guzzella, Christopher H. Onder: Introduction to Modeling and Control of Internal Combustion Engine Systems (ISBN 978-3-642-10774-0), section 2.8.3.

In a step 250, a state of the exhaust-gas catalytic converter 130 is monitored. For example, for this purpose, a temperature or a temperature distribution within the catalytic converter 130, a concentration of one or more exhaust-gas components within, upstream of and/or downstream of the catalytic converter 130 and/or a pressure upstream of, within and/or downstream of the catalytic converter 130 is ascertained by means of one or more of the sensors 145, 147.

In a step 240, it is determined whether the internal combustion engine is presently in operation. If this is the case, then in a step 280, the operation of the internal combustion engine 120 is controlled in closed-loop fashion on the basis of the determined catalytic converter fill level and possibly other parameters, such as for example a present load demand, a specification with regard to a desired or required exhaust-gas composition, a present exhaust gas temperature or the like. For this purpose, the fuel treatment device 110 can be influenced by the control unit 140. For example, a quantity of metered fuel can be adjusted, or a setting of a throttle flap for the supply of combustion air can be influenced. Influencing of the internal combustion engine 120 directly is also possible, for example by virtue of ignition times being specified.

The method 200 subsequently returns to the initialization step 210.

By contrast, if it is identified in step 240 that the internal combustion engine 120 is not in operation, then in a step 260, a diffusion of at least one exhaust-gas component, in particular of oxygen, into or out of or within the exhaust-gas catalytic converter is determined taking into consideration the catalytic converter state ascertained in step 250. For example, for this purpose, a temperature of the catalytic converter is taken into consideration such that a diffusion rate is greater at high temperature than at low temperature. Furthermore, temperature threshold values may be provided, below or above which a diffusion is not determined for example because, in the presence of such a temperature, the catalytic converter is not capable of storing the exhaust-gas component.

In the determination of the diffusion of the exhaust-gas component, it is furthermore advantageous to take into consideration the concentration of the exhaust-gas component at various points within or in the surroundings of the catalytic converter 130, because diffusion takes place in the direction of a concentration gradient. The diffusion direction is thus dependent on the relative concentration of the exhaust-gas component at locations which are fluidically connected to one another. Here, oxygen sources and oxygen sinks in the surroundings of the catalytic converter are expediently taken into consideration. Preferably, the change of the concentration of gaseous oxygen within the catalytic converter and in the surroundings thereof is described in spatially resolved form for example with the aid of a diffusion equation (Fick's second law). Analogously, it is also possible to describe changes in concentration in multiple catalytic converters connected in series.

The gaseous oxygen introduced into the catalytic converter can be stored in the catalytic converter if unoccupied storage positions are still present and the temperature of the catalytic converter is adequately high. The temperature-dependent kinetics of the storage are preferably modeled by means of an Arrhenius equation. The number of storage positions that are still unoccupied is ascertained by means of a balancing of a total number of available storage positions, storage positions already occupied with oxygen, and storage positions occupied by other exhaust-gas components. The storage of oxygen is also preferably described in spatially resolved form, for example by modeling of multiple axial slices. Alternatively, although less accurate, the change of the oxygen fill level during a diffusion phase can also be described in data-based form, for example by means of a characteristic map in a manner dependent on the duration of the diffusion phase and the catalytic converter temperature(s).

In a step 270, the ascertained diffusion is offset against the catalytic converter fill level most recently determined in step 230 or specified in the initialization step 210, and thus an updated fill level of the catalytic converter is ascertained.

The method 200 subsequently returns to step 240 or to the initialization step 210.

The linearity of the method 200 illustrated here is primarily for ease of understanding. In various configurations, several of the steps 210 to 280 may be carried out simultaneously or in a different sequence without disrupting the method 200 as a whole. For example, a measurement of exhaust-gas concentrations may be performed substantially continuously and is not dependent on whether a calculation of a fill level has already been completed. Temperatures may also be acquired substantially continuously. By contrast, a determination of the diffusion of exhaust-gas components is expedient in particular when no fresh exhaust gas is presently being generated, that is to say the internal combustion engine is not in operation. By contrast, if the internal combustion engine 120 is in operation, a speed at which the exhaust gas thereby generated flows through the catalytic converter 130 is generally so high that a diffusion of exhaust-gas components can have at most a negligibly small influence on transport processes taking place in the catalytic converter.

Therefore, in times in which the internal combustion engine 120 is in operation, the fill level of the catalytic converter 130 is dominated by a balance of exhaust-gas components introduced into the catalytic converter 130 from the internal combustion engine and exhaust-gas components discharged from the catalytic converter 130 in the direction of the atmosphere. By contrast, if the internal combustion engine is not in operation, it is possible, in a manner dependent on a respectively present state of the catalytic converter 130 and its surroundings, for a reversed flow direction to arise, at least for a proportion of the exhaust-gas components, such that, for example, oxygen can be introduced into the catalytic converter from the direction of a tailpipe. This circumstance is allowed for by means of the described method 200, such that, overall, a more exact fill level of the catalytic converter 130 with regard to exhaust-gas components stored therein can be made available, and control of the internal combustion engine can be carried out in a correspondingly more precise and emissions-optimized manner. The ascertainment of the catalytic converter fill level can in particular have the effect that, upon resumption of the combustion, the most exact possible actual value is available, in particular for closed-loop fill level control, and thus suitable control of the combustion process can be performed from the outset.

In particular for vehicles that are equipped with a start-stop system, or for hybrid electric vehicles, considerable emissions optimization potential can thus be made accessible.

Corresponding advantages can also be realized for applications outside the field of motorized mobility, wherein these are all the more pronounced the more often the operation of a corresponding combustion process is started and stopped.

The invention claimed is:

1. A method for ascertaining a fill level of at least one exhaust-gas component, which can be stored in a catalytic converter (130) and which is generated in a combustion process, in the catalytic converter (130), the method comprising:
   determining (230) a variation of the fill level of the at least one exhaust-gas component in the catalytic converter (130) during the combustion process,
   determining, based on concentrations of the at least one exhaust-gas component upstream and/or downstream of the catalytic converter (130), a concentration gradient,
   determining (260), during time periods in which the combustion process is not operated, a diffusion-induced change of the fill level of the at least one exhaust-gas component in the catalytic converter (130) based on a derived diffusion direction of the at least one exhaust-gas component determined from the concentration gradient,
   ascertaining (270), based on the determined variation during the combustion process and the diffusion-induced change, the fill level of the at least one exhaust-gas component in the catalytic converter (130), and
   controlling the fill level of the at least one exhaust-gas component, after resumption of the combustion process, based on the ascertained fill level.

2. The method (200) according to claim 1, wherein at least one state variable, comprising a temperature distribution, of the catalytic converter (130) is determined (250), and the diffusion-induced change of the fill level is determined (260) in a manner dependent on the at least one state variable.

3. The method according to claim 1, wherein, based on the concentration gradient, a diffusion rate of the at least one exhaust-gas component is calculated and is taken into consideration in the determination of the diffusion-induced change (260) of the fill level.

4. The method according to claim 1, wherein the fill level of the at least one exhaust-gas component is, after resumption of the combustion process, controlled in closed-loop fashion based on the ascertained fill level.

5. The method according to claim 4, wherein the combustion process is controlled (280) such that the fill level increases when the fill level lies below a setpoint value and decreases when the fill level lies above the setpoint value.

6. The method (200) according to claim 1, wherein the at least one exhaust-gas component comprises oxygen and/or a hydrocarbon and/or carbon monoxide and/or a nitrogen oxide.

7. The method (200) according to claim 1, wherein the combustion process is performed in the interior of an internal combustion engine (120).

8. A processing unit (140) configured to
   determine (230) a variation of a fill level of an at least one exhaust-gas component in a catalytic converter (130) during a combustion process,
   determine, based on concentrations of the at least one exhaust-gas component upstream and/or downstream of the catalytic converter (130), a concentration gradient,
   determine (260), during time periods in which the combustion process is not operated, a diffusion-induced change of the fill level of the at least one exhaust-gas component in the catalytic converter (130)) based on a derived diffusion direction of the at least one exhaust-gas component determined from the concentration gradient,
   ascertain (270), based on the determined variation during the combustion process and the diffusion-induced change, the fill level of the at least one exhaust-gas component in the catalytic converter (130), and
   control the fill level of the at least one exhaust-gas component, after resumption of the combustion process, based on the ascertained fill level.

9. A non-transitory, computer-readable medium containing instructions that when executed by a computer cause the computer to:
   determine (230) a variation of a fill level of the at least one exhaust-gas component in the catalytic converter (130) during a combustion process,
   determine, based on concentrations of the at least one exhaust-gas component upstream and/or downstream of the catalytic converter (130), a concentration gradient,
   determine (260), during time periods in which the combustion process is not operated, a diffusion-induced change of the fill level of the at least one exhaust-gas component in the catalytic converter (130) based on a derived diffusion direction of the at least one exhaust-gas component determined from the concentration gradient,
   ascertain (270), on the basis of the determined variation during the combustion process and the diffusion-induced change, a fill level of the at least one exhaust-gas component in the catalytic converter (130), and
   control the fill level of the at least one exhaust-gas component, after resumption of the combustion process, based on the ascertained fill level.

* * * * *